United States Patent
Moddemann

(10) Patent No.: US 8,010,213 B2
(45) Date of Patent: Aug. 30, 2011

(54) SAFETY DEVICE FOR THE SAFE ACTIVATION OF CONNECTED ACTUATORS

(75) Inventor: Jörg Moddemann, Sexau (DE)

(73) Assignee: Sick AG, Waldkirch (DE)

( * ) Notice: Subject to any disclaimer, the term of this patent is extended or adjusted under 35 U.S.C. 154(b) by 373 days.

(21) Appl. No.: 12/379,026

(22) Filed: Feb. 11, 2009

(65) Prior Publication Data

US 2009/0222112 A1    Sep. 3, 2009

(30) Foreign Application Priority Data

Mar. 3, 2008   (EP) .................................... 08102224

(51) Int. Cl.
*G06F 19/00* (2006.01)

(52) U.S. Cl. .................. 700/79; 714/47; 714/48; 710/1; 710/100

(58) Field of Classification Search .................... 714/47, 714/48; 710/1, 100; 700/79
See application file for complete search history.

(56) References Cited

U.S. PATENT DOCUMENTS

| | | | | |
|---|---|---|---|---|
| 4,096,990 A | * | 6/1978 | Strelow | 714/11 |
| 4,400,792 A | * | 8/1983 | Strelow | 714/11 |
| 4,841,446 A | * | 6/1989 | Leiber et al. | 701/76 |
| 4,964,095 A | * | 10/1990 | Tyrrell et al. | 370/221 |
| 5,077,732 A | * | 12/1991 | Fischer et al. | 370/437 |
| 5,543,997 A | * | 8/1996 | Ruprecht | 361/100 |
| 6,549,034 B1 | * | 4/2003 | Pietrzyk et al. | 326/38 |
| 6,647,328 B2 | * | 11/2003 | Walker | 701/36 |
| 6,886,057 B2 | * | 4/2005 | Brewer et al. | 710/63 |
| 6,915,444 B2 | * | 7/2005 | Vasko et al. | 714/4.4 |
| 7,219,165 B1 | * | 5/2007 | Gough | 709/250 |
| 2003/0058602 A1 | | 3/2003 | Veil | |
| 2009/0222107 A1 | * | 9/2009 | Moddemann et al. | 700/21 |
| 2010/0123987 A1 | * | 5/2010 | Pietrzyk et al. | 361/78 |
| 2011/0001799 A1 | * | 1/2011 | Rothenberger et al. | 348/47 |
| 2011/0071654 A1 | * | 3/2011 | Schmidt et al. | 700/79 |

FOREIGN PATENT DOCUMENTS

| | | |
|---|---|---|
| DE | 100 26 923 A1 | 2/2002 |
| DE | 100 20 075 C2 | 3/2002 |
| EP | 0 732 654 A1 | 9/1996 |
| EP | 1 247 622 A2 | 10/1998 |
| EP | 1 247 622 B1 | 2/2007 |

* cited by examiner

*Primary Examiner* — Michael D Masinick

(74) *Attorney, Agent, or Firm* — The Nath Law Group; Jerald L. Meyer; Robert T. Burns

(57) ABSTRACT

A safety device is set forth having at least one safety control and having a plurality of outputs for the safe activation of connected actuators and having inputs for the reception of signals of connected sensors as well as having a serial communications device, in particular a bus which connects the safety control to the outputs and to the inputs, to receive and/or to transmit data packets. In this respect, in addition to the serial communication at least one bypass line is provided which connects the safety control or an input to at least one output to be able to transmit a deactivation signal independently of the serial communication to an actuator connected to the output.

13 Claims, 2 Drawing Sheets

SAFETY DEVICE FOR THE SAFE ACTIVATION OF CONNECTED ACTUATORS

Figure 1:
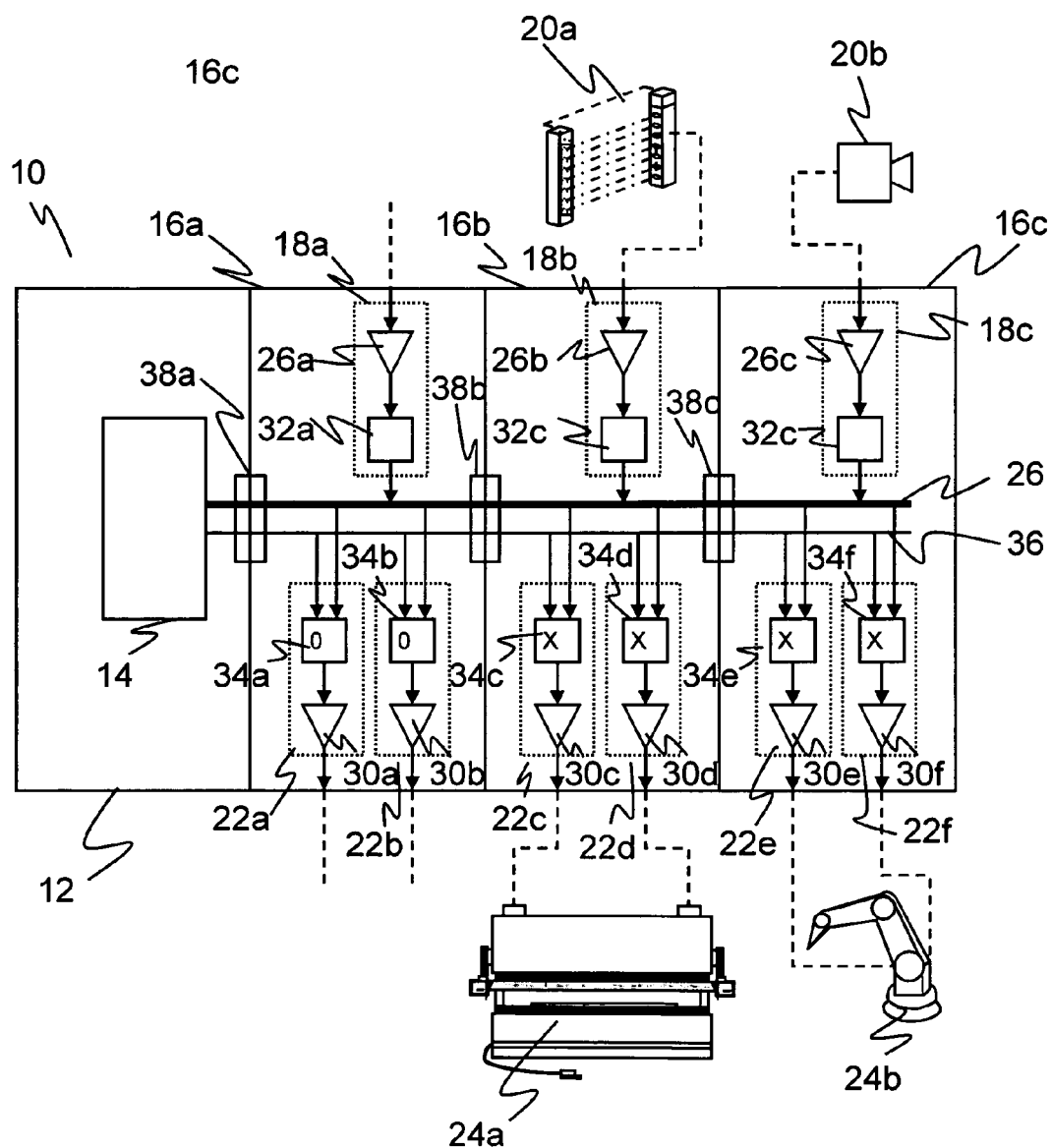

The claimed subject matter relates to a safety device and to a safety method for the safe activation and deactivation of connected actuators.

Safety switching devices serve to respond without error in a preset manner on the application of a danger signal. A safety device is a system having a safety control and a connections for outputs which can be reliably deactivated. It can therefore be a safety switching device, but it can furthermore also generate different outputs than only switching outputs. A typical application of safety engineering is the securing of dangerous machinery such as presses or robots which have to be deactivated or secured immediately when an operator approaches in an unauthorized manner. A sensor which detects the approach is provided for this purpose, for instance a light grid or a safety camera. If such a sensor recognizes a hazard, a circuit downstream of it must generate a deactivation signal with absolute reliability.

In practice, a single sensor does not normally monitor a single machine, but rather a whole series of sources of danger have to be monitored. The corresponding high number of associated sensors which can each define a switching event and of suitable measures for the elimination of hazards then only has to be configured and wired in the safety device.

So that the safety device can be adapted flexibly for the very different conceivable configurations of sensors and actuators in industrial systems, it is known from DE 100 20 075 C2, for example, to form module series of input modules and output modules which therefore each have one or more inputs or one or more outputs. The module series can be expanded in dependence on the required number of inputs and outputs.

Control information is exchanged via serial communication, frequently a so-called backplane, by at least one control unit which can itself be made as its own control module. For this purpose, the modules have control elements so that their inputs and outputs can take part in the data exchange of the bus communication.

It is disadvantageous in the conventional solutions that the speed of a data transmission is limited by the bus cycle and that the transmission times and the cycle times of the serial communication flow directly into the response time of the total system. A relatively high response time thus results above all with longer module series, whereas on the other hand, however, safety demands or the safety application require a safety-directed deactivation within a respective short evaluation cycle to be guaranteed. A delayed response time also means worse productivity of the machines and of the system in some applications.

The central control module is able to control a relatively large number of participants, that is, for example, twelve further modules. The transmission of a deactivation signal in such a long module series is, however, too slow for a required safety category for the named reasons so that restrictions arise in the application possibilities.

It would generally be conceivable to shorten the response times by parallel communication. This is, however, at best suitable for very small systems since otherwise the number of the parallel lines can no longer be handled.

It is therefore the object of the invention to achieve short deactivation times in a conventional safety switching system of the named kind.

Non-limiting examples of this object are satisfied by exemplary embodiments disclosed below.

In this respect, the solution starts from the principle of accelerating particularly time-critical communication with an additional hardware effort which is as minimal as possible and simultaneously of making use of proven connections already present in conventional systems for further communication. An optimum accelerated deactivation communication is therefore found with a hardware effort which is as small as possible. It is also conceivable to use the or a further bypass line in accordance with the invention as a deactivation signal for other particularly important and time critical signals to increase the productivity.

The solution therefore has the advantage of continuing to use conventional architectures and components of safety switching devices, but simultaneously of shortening the deactivation time of the system so that safety demands or safety categories can be observed. It is thus made possible also to connect a larger number of inputs and outputs among one another to a serial communication without delaying the response time of a deactivation by the expansion of the participants in the communication. the solution in accordance with the invention is therefore also suitable for large and complex systems.

In an advantageous further development, respective groups of inputs and/or outputs are collected together in a module to form a modular safety switching device in particular in the form of a module series and/or with each module being arranged in a housing, in particular a similar housing, each having a plug and a socket for plugging into one another. The safety switching device can be expanded and adapted in a simple manner thanks to the modular aspect and having to plan for future expansions with a large number of inputs and outputs which then lie idle can be avoided.

The safety control is advantageously provided in a separate control module, with the control module in particular itself having inputs and/or outputs. The control module forms the head of a module series and for instance controls deactivations and configurations as well as the serial communication. If it has inputs or outputs itself, it thus per already forms the shortest imaginable module series or provides a reserve for further connectors in a longer module series.

At least one first bypass line and one second bypass line are preferably provided, with the first bypass line connecting the safety control to at least one output and the second bypass line connecting an input to at least one output. Such further bypass lines make it possible that a plurality of signal sources can result in a fast deactivation, namely the safety control itself but also an input acting directly on outputs via a bypass line. A higher flexibility is thus created.

The outputs are advantageously made to be configured to the bypass line, with the configuring defining for each output connected to the bypass line whether this output should shut down the connected actuator or not in response to the deactivation signal. The physical connection of the bypass line for the simplification of the hardware can thus always lead to all outputs or to a large number of outputs. If non-safety critical actuators or actuators which should not be affected by a shutdown for other reasons are connected to outputs, this can be set by the configuration.

The inputs, outputs, the safety control, the serial communication and/or the bypass line are preferably made for a function test and/or in fail-safe manner, in particular with two channels. Error sources within the safety switching device can be recognized or suppressed in this manner.

In a preferred further development, an external system control is provided and the safety control is made such that activators of the actuators by the system control only act on the actuators when the safety control consents. Such an external system control is usually not designed as safe. It must therefore be left up to the safety control whether an actuator can be operated. Since the safety control of the system control has to consent, for instance by a simple AND link, the system control can transmit its non-safety critical commands to the actuators without any loss in safety and speed and thus enable an integration of the safety switching device which is as free of defects as possible.

In a further preferred further development of the invention, the safety control is made to additionally transmit a deactivation signal over the serial communication, with the outputs being made such that a switching on of a connected actuator can only take place when the safety control consents. Even if the deactivation command itself is transmitted via the bypass line, participants in the serial communication are also informed of the deactivation in this manner which are not connected to the bypass line or are not configured to it, and they can, for example, in turn carry out non-safety critical deactivations. In addition, it is ensured by the transmission of a deactivation signal by serial communication that a deactivation takes place at least somewhat later even on a failure of the bypass line. Finally, the appropriate signal for the switching back on of a safety-directed deactivated actuator is not only the release of the bypass line, but rather also a consent of the safety control which may only take place, for example, after an authorization by an operator after an inspection and elimination of the causes of the deactivation.

The method in accordance with the invention can be further developed in a similar manner and shows similar advantages. Such advantageous features are described in an exemplary, but not exclusive manner in the subordinate claims dependent on the independent claims.

Figure 2:
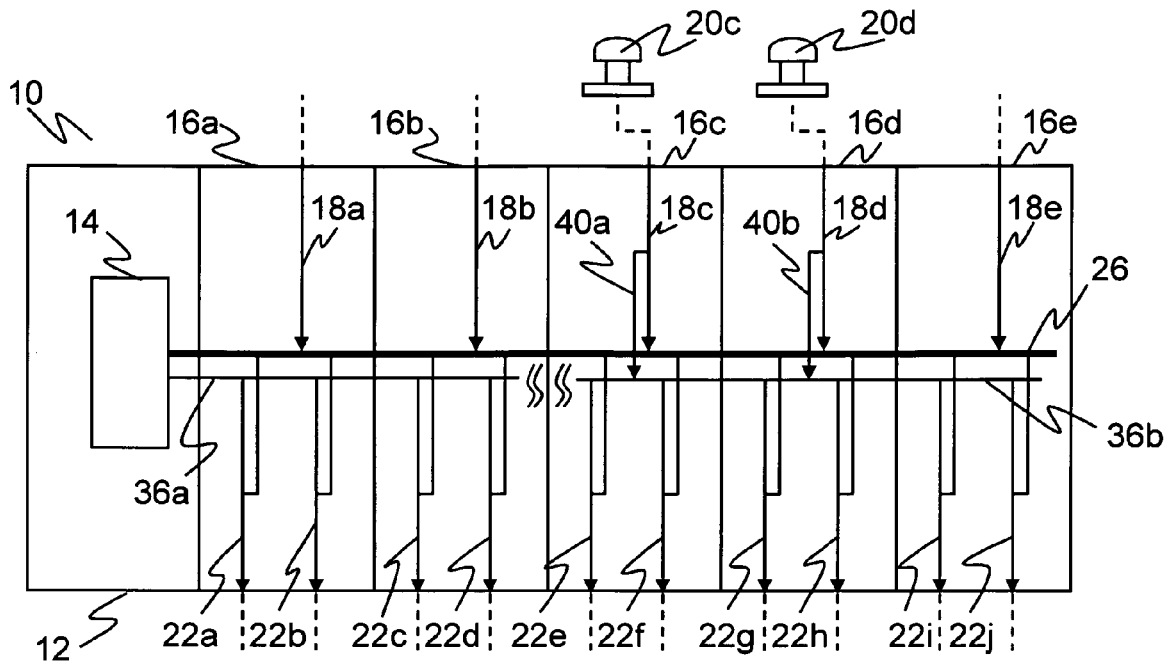
Figure 3:
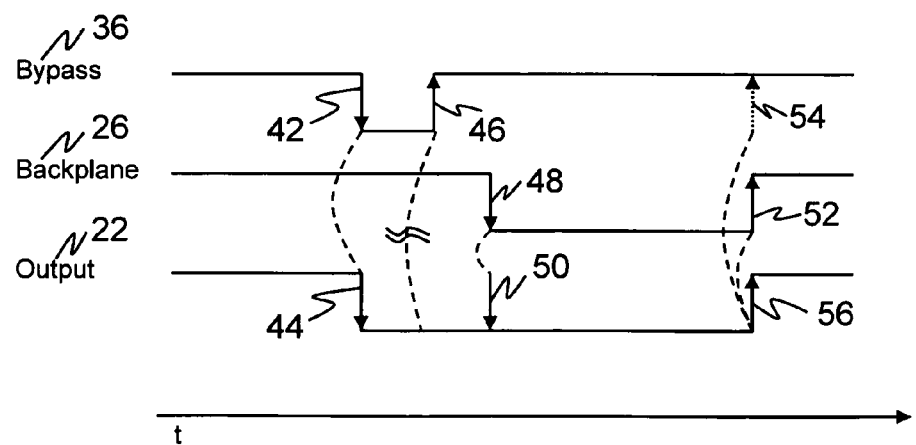

The invention will be explained in more detail in the following also with respect to further features and advantages by way of example with reference to embodiments and to the enclosed drawing. The Figures of the drawing show in:

FIG. 1 a first embodiment of the invention with a control module and three connector modules, some sensors and actuators connected by way of example and a bypass line;

FIG. 2 a second embodiment of the invention which, unlike the first embodiment, additionally has a second bypass line; and FIG. 3 the signal evolution at the bypass line, backplane and an output for the explanation of the required consent by the safety control on the switching back on of an actuator.

FIG. 1 shows a first embodiment of a safety device 10 in accordance with the invention or a safety switching device having a central control module 12 which has a safety control 14 and three connector modules 16a-c. The central control module 12 works as a master for the communication in the safety device 10, but these and further control tasks can also be physically distributed and are nevertheless combined in terminology under the central control 14. Inputs 18a-c for the connection of sensors 20a-b and outputs 20a-f for the connection of actuators 24a-b are provided in each connector module 16a-c.

A light grid 20a and a safety camera 20b are examples for safety-relevant sensors which can deliver a signal to which a safety-directed deactivation takes place as a response. This can be an interruption of the light rays of the light grid 20a by a body part or the recognition of an unauthorized intervention into a protected zone by the safety camera 20b. Further safety sensors of any desired kind, such as laser scanners, 3D cameras, safety shutdown mats or capacitive sensors, can be connected to the inputs 18a-c, but also other sensors, for instance for the taking of measurement data or simple switches such as an emergency off switch.

A press brake 24a and a robot 24b are connected in each case in two channels to outputs 22c-d or 22e-f as examples for actuators endangering operators on an unauthorized intervention and can thus receive a deactivation command from the safety switching device 10 in order to deactivate the actuators 24-ab or to move them into a safe state on recognition of a hazard or of an unauthorized intervention by safety sensors 20a-b. In this respect, the light grid 20a can serve for the monitoring of the press brake 24a and the safety camera 20b can serve for the monitoring of the robot 24b so that mutually functionally associated sensors 20a-b and actuators 24a-b are also each connected to a module 16a and 16b respectively. The functional association, however, takes place via the safety control 14 so that such an imaging of the system is admittedly clearer, but in no way required. Further actuators than those shown are conceivable, and indeed both those which generate a hazardous region and others, for instance a warning lamp, a siren, a display and the like.

A serial communications connection called a backplane is present between the safety control 14 and the inputs 18a-c or the outputs 22a-f respectively and is in particular a bus 26 and can be based on a field bus standard such as an IO link, a Profibus, CAN or also a proprietary standard and can additionally also have a failsafe design.

The inputs 18a-c and the outputs 20a-f each have an actual connector 28a-c and 30a-f respectively and a microcontroller 32a-c and 34a-f respectively for participation in the communication with the bus 26. Sensor signals of the sensors 20a-b can thus be applied to the bus 26 and commands can be issued to the actuators 24-ab via the bus 26. In contrast to the representation, the communication can, however, also be bidirectional in the inputs 18a-c and in the outputs 22a-f; a signal such as a status query can then, for example, be transmitted to the sensors 20a-b or status information can be received by the actuators 24a-b and can be exchanged via the bus 26.

A bypass line 36 which connects the safety control 14 to the outputs 22a-f is provided for the forwarding of a safety-directed deactivation (OSSD, output switching signal device) from a sensor 20a-b to affected actuators 24a-b. The deactivation signal is therefore forwarded parallel to and independently of the serial communication on the bus 26 and is particularly fast due to its independence from a bus cycle.

The outputs 22a-f connected to the bypass line 36 can be configured via the microcontrollers 34a-f as to whether they should listen to the bypass line 36 or not. An output 22a-b not connected to a hazard source is instructed by configuration ("0") not to forward the deactivation, whereas outputs 22c-f with connected dangerous actuators 24a-b listen to the bypass line 36 and forward the deactivation signal for the carrying out of the deactivation to the actuators 24a-b. The modules 16a-c can be made uniformly with a throughgoing bypass line 36 due to the configuration possibility, with the required flexibility of the activation by the bypass line 36 being established by means of the configuration.

In addition to the transmission on the bypass line 36, the deactivation signal can also be transmitted on the bus 26 so that actuators not addressed by the deactivation can be put into a state of rest at outputs 22a-b configured in this manner or so that, in the case of a defect of the bypass line 36, a deactivation takes place at least with a delay due to the slower bus communication.

The modules 12, 16a-c are each accommodated in uniform housings and are connected to one another mechanically and electrically by connector pieces 38. The safety control 14, the inputs 18a-c, the outputs 22a-f, the bus 26 and the bypass line 36 are made as failsafe, that is by measures such as two-channel design, by diverse, redundant, self-checking or otherwise safe evaluations and self-tests. Corresponding safety demands for the safety control are laid down in the standard EN 954-1 or ISO 13849 (performance level). The thus possible safety classification and the further safety demands on an application are defined in the standard EN 61508 and EN 62061.

The modules 12, 16a-c, their safety control 14 and the inputs 18a-c as well as outputs 22a-f can be configured by externally attached rotary switches or other operating elements both with respect to the listening to the bypass line 36 and for the mapping of the safety control task, that is in particular which incidents should lead to a deactivation. Alternatively to such operating elements, wireless or wired interfaces can be provided for the connection of configuration software by notebook, computer, PDA, cell phone or the like. A web server can also be implemented in the safety control 14 for uniform configuration.

The safety switching device 10 can be connected via a gateway which forms a separate module or is integrated into the safety control 14 to an external system control which deals with non-safety relevant control aspects. The connection can take place in wireless or wired manner, usually via a field bus in practice. If the external control sends a command to one of the actuators 24a-b, and indeed alternatively via the outputs 22a-f which can also output deactivation signals or to separate outputs, it only becomes active when the safety control 14 consents, that is for instance by AND link of control and consent signal. It is thus prevented that the external system activation creates a dangerous situation.

FIG. 2 shows a second embodiment of the invention, with the same reference numerals designating the same features here and in the following. In the example shown, unlike in FIG. 1, a total of five connector modules 16a- are shown, that is two additional connector modules 16d-e. Furthermore, to maintain clarity, the inputs 18a-e and the outputs 22a-j were shown in simplified form only as arrows without wanting to express any content differences thereby. The inputs 18a-e and the outputs 22a-j are therefore also made here to participate in the communication via the bus 26 and, equally as in FIG. 1, sensors 20a-b and actuators 24a-b can be connected.

The difference of the second embodiment with respect to the first embodiment lies in the fact that two bypass lines 36a and 36b are provided. The safety control 14 reaches the outputs 22a-d of the first two connector modules 16a-b via the first bypass line 36a. The second bypass line 36b is connected to the outputs 22e-j of the rear three connector modules 16c-e. The second bypass line 36b is addressed via sensors 20c-d and special deactivation inputs 40a-b which are also connected to the second bypass line 36b in addition to the bus 26. Emergency-off switches 20c-d are shown by way of example here.

Actuators at the first two connector modules 16a-b can thus be deactivated via the safety control 14; actuators at the three connector modules 16c-e can be deactivated via each of the two emergency-off switches 20c-d. The deactivation inputs 40a-b can be made configurable so that it is therefore laid down by a configuration whether their signal activates the bypass line or not. Instead of the shown two deactivation inputs, more or fewer deactivation inputs 40a-b can naturally also be provided.

There can be further bypass lines in accordance with the same principle. As in the example of FIG. 2, they can each be made only alternatively, but also partially or continuously in parallel provided that one wants to make the additional hardware effort. Practically any desired configurations of incidents triggering a deactivation and groups of actuators can thus be represented which should each respond to such an incident by a deactivation.

FIG. 3 shows signals in the bypass line 36, in the bus 26 and in an output 22 listening to the bypass line during a deactivation and a subsequent switching back on. The deactivation signal on the bypass line 36, that is the falling flank 42, results in an immediate falling flank 44 on the output 22 and thus in a deactivation of the connected actuator. When the triggering incident has passed at a later time, that is, for instance, when an unauthorized intervention in a protected zone is no longer present, a deactivation signal is accordingly also no longer applied to the bypass line 36. The corresponding rising flank 46, however, does not yet result in a switching back on of the actuator. First, here, the safety control 14 must still consent, for instance because the release of further sensors or actuators has to be waited for.

The deactivation signal is also signaled on the bus 26 by a falling flank 48 but with a time delay. Deviating from the representation in FIG. 3, this delayed deactivation signal can naturally also be applied before the rising flank 46 on the bypass line already indicates the end of the triggering incident again. The falling flank 46 on the bus 26 again results in a deactivation signal 50 to the actuator, but one which no longer has any effect since said actuator has already been deactivated.

If the safety control 14 signals its consent to a switching back on at a later time by a rising flank 52 and if simultaneously, as indicated by a dashed arrow 54, a deactivation signal is also no longer applied on the bypass line 36, the output 22 also follows the switch-on signal by a rising flank 56 and the connected actuator is activated again.

The invention claimed is:

1. A safety device, comprising:
   at least one safety control;
   a plurality of outputs for the safe activation of connected actuators;
   a plurality of inputs for the reception of signals of connected sensors;
   a serial communications device which connects the safety control to the outputs and to the inputs to receive and/or to transmit data packets; and
   at least one bypass line parallel to and independent of the serial communication device, the bypass line being independent from a bus cycle and connecting the safety control or at least one of the plurality of inputs to at least one of the plurality of outputs and being configured to transmit a deactivation signal independently of the serial communication device to an actuator connected to at least one of the plurality of outputs.

2. A safety device in accordance with claim 1, wherein respective groups of inputs and/or of outputs are combined together in a module to form a modular safety switching device in the form of a module series; and/or
   wherein each module is arranged in a housing having a plug and a socket for plugging into one another.

3. A safety device in accordance with claim 1,
   wherein the safety control is provided in a separate control module; and
   wherein the control module itself has inputs and/or outputs.

4. A safety device in accordance with claim 1,
   wherein a first and a second bypass line are provided; and
   wherein the first bypass line connects the safety control to at least one output and the second bypass line connects at least one input to at least one output.

5. A safety device in accordance with claim 1,
wherein the plurality of outputs connect to the at least one bypass line; and
wherein the plurality of outputs also connect to at least one actuator via the bypass line and are configured to determine whether to deactivate the connected actuator in response to the deactivation signal.

6. A safety device in accordance with claim 1, wherein the inputs, the outputs, the safety control, the serial communications device and/or the bypass line are configured for a function test and/or failsafe with two channels.

7. A safety device in accordance with claim 1, wherein an external system control is provided and the safety control is made such that controls of the actuators from the system control only act on the actuators when the safety control consents.

8. A safety device in accordance with claim 1,
wherein the safety control is made to additionally transmit the deactivation signal over the serial communications device; and/or
wherein the outputs are made such that a switching on of a connected actuator can only take place when the safety control consents.

9. A safety method for the safe deactivation of actuators, comprising the steps of:
connecting at least one safety control to a plurality of inputs and outputs;
connecting a serial communications device to the plurality of inputs and outputs, the serial device being configured to receive and/or transmit data packets; and
connecting at least one bypass line to at least one of the plurality of inputs and outputs, wherein:
the at least one bypass line is parallel to and independent of the serial communication device,
the at least one bypass line is independent from a bus cycle, and
the at least one bypass line is configured to transmit a deactivation signal independently of the serial communication device to at least one actuator connected to at least one of the plurality of outputs.

10. A safety method in accordance with claim 9, wherein the deactivation signal is transmitted to a first group of outputs over a first bypass line and to a second group of outputs over a second bypass line; and/or
wherein the deactivation signal is generated by at least one safety control and/or by at least one input to which a sensor is connected.

11. A safety method in accordance with claim 9, further comprising the steps of:
deciding whether a respective output connected to the at least one bypass line should deactivate the connected actuator in response to a deactivation signal received over the at least one bypass line.

12. A safety method in accordance with claim 9, further comprising the steps of:
configuring the safety control to control the outputs, the inputs, the serial communications device and the at least one bypass line; and/or
configuring the safety control to transmit the deactivation signal to the at least one bypass line over the serial communications device.

13. A safety method in accordance with claim 12, wherein activations of an external system control are transmitted to the outputs and these activations can only act on the actuators when the safety control consents; and/or
wherein a switching on of an actuator connected to an output can only take place when the safety control consents.

* * * * *